US006691310B2

(12) United States Patent
Hirasawa et al.

(10) Patent No.: US 6,691,310 B2
(45) Date of Patent: Feb. 10, 2004

(54) INFORMATION RECEIVER AND INFORMATION TRANSMISSION AND RECEPTION METHOD PROVIDING INFORMATION USAGE STATUS

(75) Inventors: Shigeki Hirasawa, Sagamihara (JP); Yuichi Yagawa, Yokohama (JP); Eiichi Yukino, Ebina (JP); Michio Morioka, Hitachi (JP); Toru Yamada, Yokohama (JP); Nobukage Takahashi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 09/276,113

(22) Filed: Mar. 25, 1999

(65) Prior Publication Data

US 2002/0056092 A1 May 9, 2002

(30) Foreign Application Priority Data

Mar. 30, 1998 (JP) .......................................... 10-084131

(51) Int. Cl.[7] .......................... H04N 7/167; H04N 7/16

(52) U.S. Cl. ............................ 725/25; 725/27; 725/30; 725/39; 380/210

(58) Field of Search ............................. 348/1, 4, 5, 10, 348/906; 455/2; 725/25, 32–36, 9–31; 380/210–211

(56) References Cited

U.S. PATENT DOCUMENTS 5,260,778 A * 11/1993 Kauffman et al. ............ 725/33
5,619,247 A * 4/1997 Russo ........................ 725/104
5,758,257 A * 5/1998 Herz et al. .................. 725/116
5,774,170 A * 6/1998 Hite et al. ................ 725/34 X
5,818,441 A * 10/1998 Throckmorton et al. .... 725/110
5,828,402 A * 10/1998 Collings ...................... 725/28
5,862,219 A * 1/1999 Glaab ......................... 380/210
5,872,588 A * 2/1999 Aras et al. ..................... 348/1
6,002,393 A * 12/1999 Hite et al. .................... 725/34
6,005,598 A * 12/1999 Jeong .......................... 725/28

* cited by examiner

*Primary Examiner*—Andrew Faile
*Assistant Examiner*—Reuben M. Brown

(57) ABSTRACT

An information receiver comprising a unit receiving information having a package number identifying the information, a first storage section where said package number is stored, a second storage section where reception information indicating whether or not said information associated with said package number was received, and a third storage section where display information indicating whether or not said information associated with said package number was displayed.

7 Claims, 16 Drawing Sheets

| AUDIENCE DISPLAY CODE \ PROVIDER DISPLAY CODE | DISPLAY | NON-DISPLAY | FORCED DISPLAY |
|---|---|---|---|
| ALL DISPLAY | DISPLAY | DISPLAY | DISPLAY |
| NO SPECIFICATION | DISPLAY | NON-DISPLAY | DISPLAY |
| ALL NON-DISPLAY | NON-DISPLAY | NON-DISPLAY | DISPLAY |

FIG.6

110

| CONTENT CODE (1101) | DEFINITION (1102) |
|---|---|
| 1001 | MEN IN THEIR THIRTIES |
| 1002 | PEOPLE LIVING IN TOKYO |
| 1003 | SPORTS FANS |
| : | : |

FIG.7

109

| DATA NUMBER (1091) | DATA NAME (1092) | DATA FILE NAME (1093) | CONTENT CODE (1094) | PROVIDER DISPLAY CODE (1095) |
|---|---|---|---|---|
| 10001 | AAA CHOCOLATE | 13001.html | 1003 | NON-DISPLAY |
| 10002 | BBB WHISKY | 13002.html | 1002 | DISPLAY |
| 10003 | CCC CRAB | 13003.html | 1001 | DISPLAY |
| : | : | : | : | : |

FIG.9

108

| PROVIDER NUMBER (1081) | CHANNEL NUMBER (1082) | PROGRAM NUMBER (1083) | CURRENT SPOT NUMBER (1084) |
|---|---|---|---|
| 36589023 | 101 | 9712010205 | 0005 |
| 36589023 | 102 | 9712010102 | 0003 |
| 36589023 | 102 | 0000000000 | 1256 |
| 36589023 | 000 | 0000000000 | 6892 |
| ⋮ | ⋮ | ⋮ | ⋮ |

FIG.10

107

| PACKAGE NUMBER (1071) | DATA NUMBER (1072) | TRANSMISSION START TIME (1073) | CONTENT CODE (1074) | PROVIDER DISPLAY CODE (1075) |
|---|---|---|---|---|
| 110001 | 10001 | 97/12/01/13:25:00 | 1003 | DEFAULT |
| 110002 | 10003 | 97/12/01/13:35:00 | 1002 | DEFAULT |
| 110003 | 10002 | 97/12/01/13:55:00 | 1001 | NON-DISPLAY |
| ⋮ | ⋮ | ⋮ | ⋮ | ⋮ |

1171 1172 117

| CHANNEL NUMBER | PACKET ID |
|---|---|
| 101 | 10001 |
| 102 | 10002 |
| 103 | 10003 |
| ⋮ | ⋮ |

FIG.17

208

| CONTENT CODE (2081) | DEFINITION (2082) | STATUS (2083) |
|---|---|---|
| 1001 | AGE=THIRTIES & SEX=MALE | REGISTERED |
| 1002 | ADDRESS=TOKYO | REGISTERED |
| 1003 | HOBBY=SPORTS | NOT-REGISTERED |
| 1004 | SEX=MALE | REGISTERED |
| 1005 | SEX=FEMALE | NOT-REGISTERED |
| 1006 | ADDRESS=TOKYO | REGISTERED |
| 1007 | TASTE=ALCOHOL | REGISTERED |
| ⋮ | ⋮ | ⋮ |

FIG.18

207

| CHANNEL NUMBER (2071) | PACKET ID (2072) | CONTRACT STATUS (2073) | RECEPTION STATUS (2074) |
|---|---|---|---|
| 101 | 10001 | YES | RECEIVE |
| 102 | 10002 | NO | CANNOT RECEIVE |
| 103 | 10003 | YES | RECEIVE |
| 104 | 10004 | YES | NON-RECEPTION |
| ⋮ | ⋮ | ⋮ | ⋮ |

FIG.19

206

| PACKAGE NUMBER (2061) | SELECTIVE RECEPTION (2062) | DISPLAY (2063) | DISPLAY START TIME (2064) | DISPLAY END TIME (2065) |
|---|---|---|---|---|
| 36589023102971201010 20004 | YES | YES | 971201133523 | 971201133623 |
| 36589023102971201010 20005 | NO | NO | 000000000000 | 000000000000 |
| 36589023102971201010 20006 | YES | NO | 000000000000 | 000000000000 |
| 36589023102971201010 20007 | YES | YES | 971201134535 | 971201134903 |
| 36589023102971201010 20008 | NO | NO | 000000000000 | 000000000000 |
| ⋮ | ⋮ | ⋮ | ⋮ | ⋮ |

FIG.20

| AUDIENCE DISPLAY CODE \ PROVIDER DISPLAY CODE | DISPLAY | NON-DISPLAY | FORCED DISPLAY |
|---|---|---|---|
| ALL DISPLAY | DISPLAY | DISPLAY | DISPLAY |
| NO SPECIFICATION | DISPLAY | NON-DISPLAY | DISPLAY |
| ALL NON-DISPLAY | NON-DISPLAY | NON-DISPLAY | DISPLAY |

INFORMATION RECEIVER AND INFORMATION TRANSMISSION AND RECEPTION METHOD PROVIDING INFORMATION USAGE STATUS

BACKGROUND OF THE INVENTION

The present invention relates to a method of information transmission between an information transmitter and an information receiver. It also relates to the information transmitter and the information receiver.

Conventionally, when information is broadcast from an information transmitter to an information receiver, the information receiver records whether or not the information has been received. In this recording method, the date and time the information was received and the number of channel through which data was transmitted are recorded.

This method assumes that the received information is television programs, that is, video and sounds played back in real time, and that the received information is displayed at the same time it is received. However, the received information is sometimes recorded on such devices as a video cassette recorder but will not actually be played back. In addition, when multiple pieces of information are received in a specific period of time concurrently, only one of them is sometimes displayed and others are not.

Another type of received information is data, that is, text or still images. Unlike TV program video, these are independent of the time for the TV program, in other words, the TV broadcasting time. That is, a TV program is usually broadcast in a specific period of time through a specific channel according to the TV program, while data may be broadcast multiple times a day or across multiple channels. In this case, the conventional method in which the date/time and the number of channel are recorded does not determine which data was received.

Data, one type of received information, is also easy to record on a storage unit, meaning that there is also the problem that data was received but not was displayed and, as a result, the program rating cannot be determined.

Another problem is that, when the audience received but did not displayed data, there is no device to estimate the reason for it.

The conventional method by which the reception date/time and the number of channel used for reception are recorded does not indicate whether or not the audience actually displayed the received information.

In particular, when the received information is data, the method does not indicate which data was received.

SUMMARY OF THE INVENTION

It is an object of the present invention to provide a device and a method indicating which information was received and whether or not the received information was displayed when information is sent from sending equipment to receiving equipment.

It is another object of the present invention to provide a device indicating, when the audience received but not displayed data, the reason for it.

To achieve the above objects, the present invention attaches an identification number, called a package number, to transmission information. A receiver manages reception and display separately with package numbers as the key, and records the reception time and the display time so that data received but not displayed can be identified. The present invention also adds a content code representing the contents of received information to received information, and a display code representing a display priority to transmission data. This makes it possible, when the audience received but not displayed data, to estimate the reason for it.

A system according to the present invention has a configuration described below. An information transmitter transmitting information comprises a unit creating a package number identifying the transmission information, a unit adding the package number to the transmission information, and a unit transmitting the transmission information having the package number to an information receiver.

The information receiver comprises a unit receiving the transmission information having the package number identifying the transmission information and a unit determining, with the use of the package number, if the received transmission information was displayed on a display unit.

The unit determining if the received transmission information was displayed, which is included in the information receiver, may determine if the received transmission information was displayed on the display unit based on a reception time at which the transmission information was received and a display time at which the transmission information was displayed.

The information receiver has a first storage unit where the fact that the transmission information was received and the package number are stored and a second storage unit where, when the transmission information was displayed, the fact that the transmission information was displayed and the package number are stored. The unit determining if the received transmission information was displayed may determine whether the information was displayed, based on the contents stored in the first and second storage units.

The information receiver may further comprise a unit adding a content code indicating the contents of the transmission information received by the unit receiving the transmission information and a display code indicating the display priority of the transmission information.

The present invention also provides a method for use in the information receiver where information indicating whether or not the transmission information is to be displayed is stored, the information receiver receiving the transmission information from the information transmitter transmitting the information. The method comprises the steps of receiving the transmission information having the package number added by the information transmitter and identifying the transmission information, storing the fact that the transmission information was received and the package number added to the received transmission information, storing, when the received transmission information was displayed on the display unit of the information receiver, the fact that the transmission information was displayed and the package number added to the displayed transmission information, and determining whether or not the transmission information was displayed based on the stored package number.

According to the present invention, when information is transmitted from transmission equipment to reception equipment, it is possible to determine which information was received and whether received information was displayed.

The present invention also provides materials for use in estimating, when audience received but did not display data, the reason for it.

BRIEF DESCRIPTION OF THE DRAWINGS

FIG. 6 is a diagram showing an example of the configuration of the content code management table of the data transmitter.

FIG. 7 is a diagram showing an example of the configuration of the data file of the data transmitter.

FIG. 9 is a diagram showing an example of the configuration of the package management table of the data transmitter.

FIG. 10 is a diagram showing an example of the configuration of the packet management table of the data transmitter.

FIG. 17 is a diagram showing an example of the configuration of the content code management table of the data receiver.

FIG. 18 is a diagram showing an example of the configuration of the channel management table of the data receiver.

FIG. 19 is a diagram showing an example of the configuration of the execution management table of the data receiver.

FIG. 20 is a diagram showing the relation between the provider display code and the audience display code.

DESCRIPTION OF THE PREFERRED EMBODIMENTS

An embodiment of the present invention will be described below.

Figure 1:
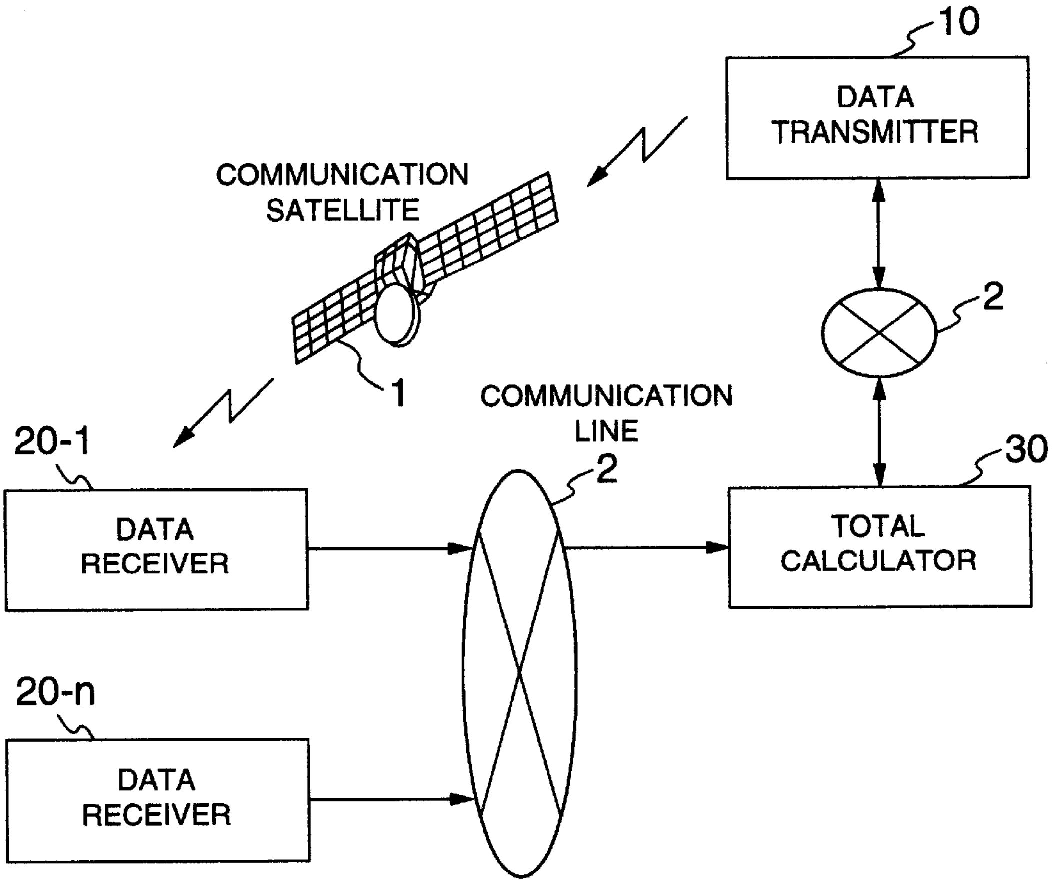
FIG. 1 is a diagram showing an example of the configuration of the system of a first embodiment.

FIG. 1 is a diagram showing the configuration of the embodiment according to the present invention.

This system comprises at least one data transmitter 10, at least one data receiver 20-1, . . . , 20-*n*, a communication satellite 1 acting as a medium through which these devices communicate, at least one total calculator 30 calculating data received from the data receivers, and a network 2 which is a medium via which the total calculator 30 communicates with the data receivers 20-1, . . . , 20-*n*, and the data transmitters 10. The communication media may be via radio waves or cable. It should be noted that the communication medium between the data receivers 20 and the total calculator 30 and between the data receivers 20 and the total calculator 30 may be the same or different.

Figure 2:
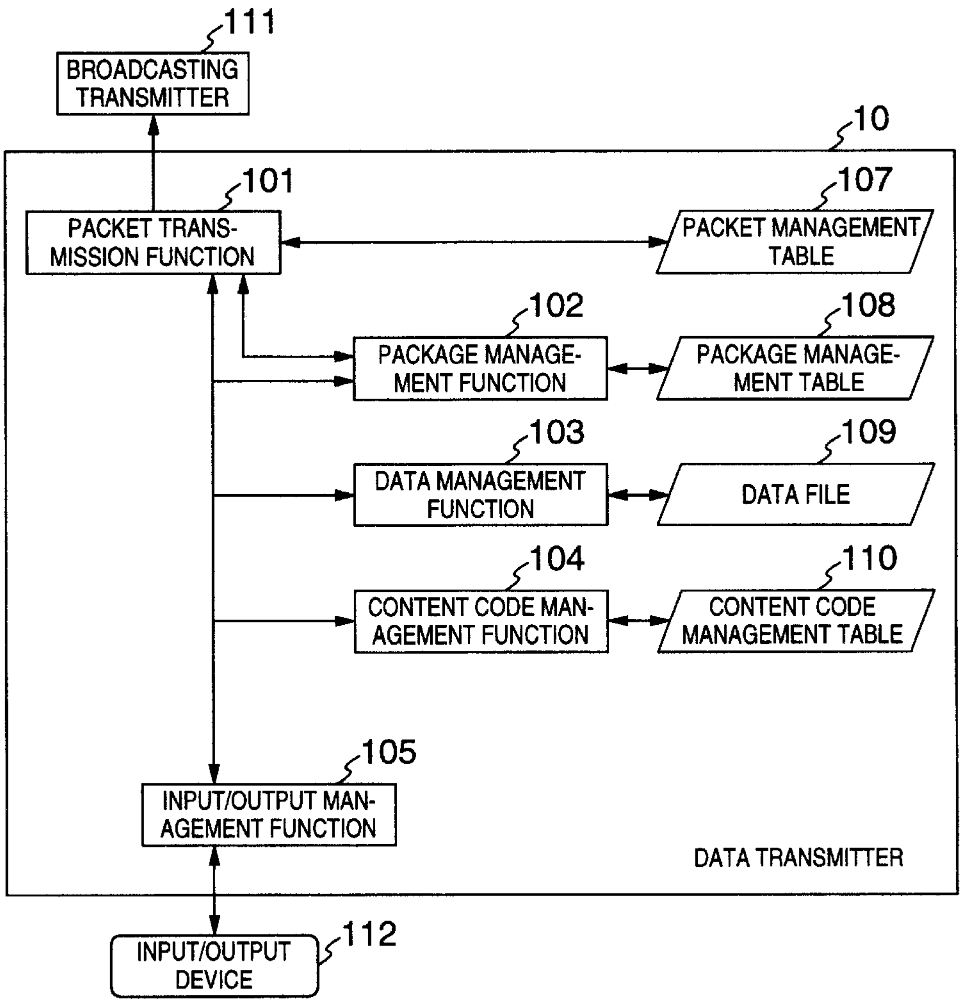
FIG. 2 is a diagram showing an example of the functional configuration of a data transmitter.

FIG. 2 shows the detailed functional configuration of the data transmitter 10. The data transmitter 10 has five basic functions, that is, a packet transmission function 101, a package management function 102, a data management function 103, a content code management function 104, and an input/output management function 105, and four tables, that is, a packet management table 107, a package management table 108, a data file 109, and content code management table 110. The packet transmission function 101 sends packets to the communication satellite 1, which acts as a transmission medium, via a broadcasting transmitter 111. The input/output management function 105 manages input/output to or from an input/output device 112 such as a display, keyboard, disk, and communication device.

Figure 3:
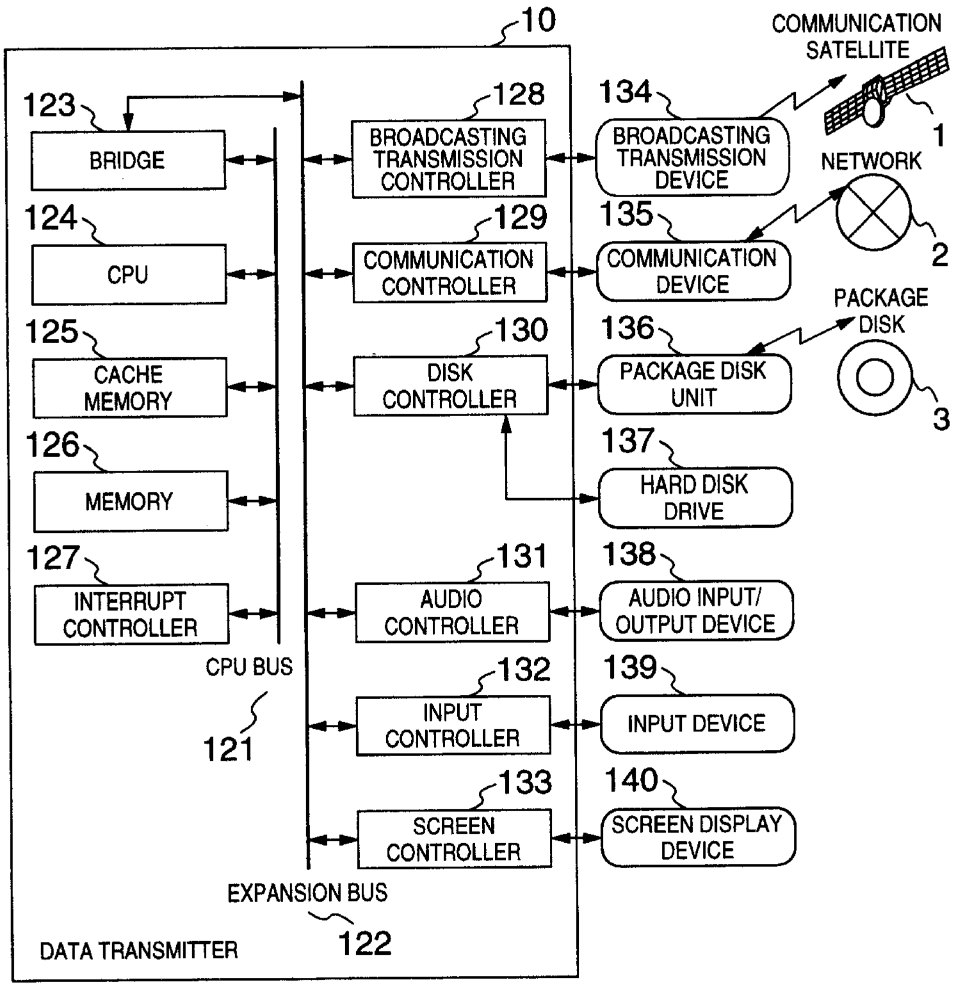
FIG. 3 is a diagram showing an example of the hardware configuration of the data transmitter.

FIG. 3 shows the detailed hardware configuration of the data transmitter 10. The data transmitter 10 comprises a CPU bus 121, an expansion bus 122, a bridge 123, a CPU (central processing unit) 124, a cache memory 125, a memory 126, an interrupt controller 127, a broadcasting transmission controller 128, a communication controller 129, a disk controller 130, an audio controller 131, an input controller 132, and a screen controller 133. The cache memory 125 and the memory 126 each contain a controller, and the memory 126 contains a ROM and a RAM.

The CPU bus 121 is a bus connecting to the CPU (central processing unit) 124. The bridge 123, CPU 124 cache memory 125, memory 126, and interrupt controller 127 are connected to the CPU bus 121.

The CPU 124 interprets instructions and controls execution, and the memory 126 stores programs and data. The cache memory 125 allows for high-speed access. The interrupt controller 127 controls an interrupt signal to the CPU, that is, a signal which suspends the current CPU processing temporarily and makes its own interrupt processing request. The bridge 123 is a circuit connecting the CPU bus 121 to the expansion bus 122.

The expansion bus 122 is a bus via which data is transferred to or from various input/output devices. To the expansion bus 122 is connected the broadcasting transmission controller 128, communication controller 129, disk controller 130, audio controller 131, input controller 132, and screen controller 133. The broadcasting transmission controller 128, which controls broadcasting transmission via the communication satellite 1, is connected to a broadcasting transmission device 134 which sends broadcasting waves to the communication satellite 1. The communication controller 129 controls communication with other devices (other data receivers 20 or data transmitters 10) via a communication device 135 such as a modem or an ISDN terminal adapter over the network 2 such as a public network or ISDN network. The disk controller 130 is a controller such as an SCSI disk controller. It is connected to a package disk unit 136, such as a CD-ROM drive or a DVD (Digital Video Disk) drive on which a package disk 3, a removable recording medium, is mounted, and to a hard disk drive 137. The audio controller 131, which controls audio input and output, is connected to an audio input/output device 138 such as an microphone and speaker. The input controller 132 controls an input device 139 such as a keyboard or a mouse. The screen controller 133 controls a screen display device 140 such as a CRT, LCD, or PDP.

The relation between the functional configuration shown in FIG. 2 and the hardware configuration shown in FIG. 3 will be described. All functions shown in FIG. 2 are achieved by the CPU 124 which interprets and executes programs implementing each function. When a function is executed, the corresponding program is in the memory 126 or cache memory 125. At execution time, all tables and files shown in FIG. 2 are also in the memory 126 or cache memory 125. At non-execution time, the programs, tables and files for the functions are in the memory 126 or on the hard disk drive 137.

The packet transmission function 101, interpreted by the CPU 124, issues instructions controlling the broadcasting transmitter 111 to the broadcasting transmission controller 128. The input/output management function 105, interpreted by the CPU 124, controls input/output devices 120 such as the communication device 135, package disk unit 136, hard disk drive 137, audio input/output device 138, input device 139, and screen display device 140 via the communication controller 129, disk controller 130, audio controller 131, input controller 132, and screen controller 133.

The functional operation of the data transmitter 10 will be described with reference to the drawings.

Figure 4:
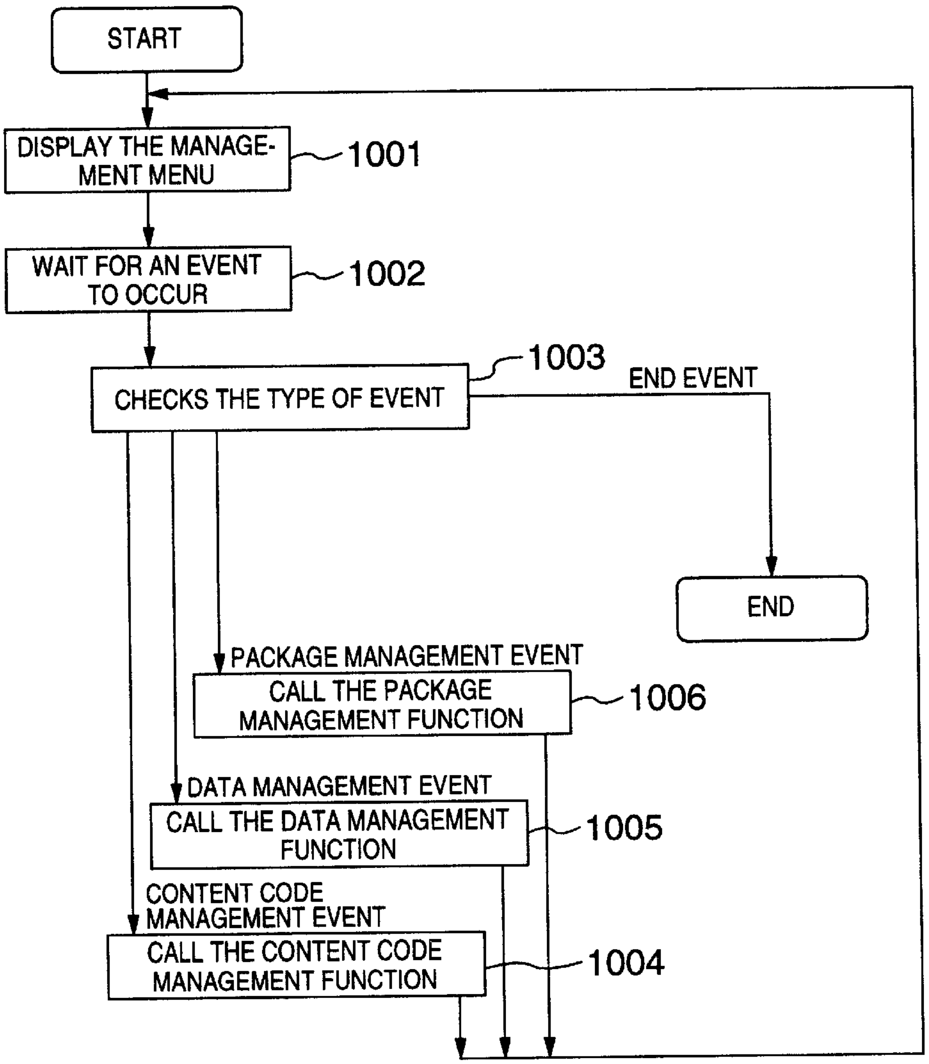
FIG. 4 is a flowchart showing an example of main processing of the data transmitter.

FIG. 4 is a flowchart showing the main flow executed by the CPU 124 of the data transmitter 10.

The input/output management function 105 of the data transmitter 10 first displays a management menu on the screen display device 140 (1001) and enters the event-wait status (1002). The event-wait status refers to a status in which the function waits for an event, such as a click on a button or the reception of a packet, to occur.

Figure 5:
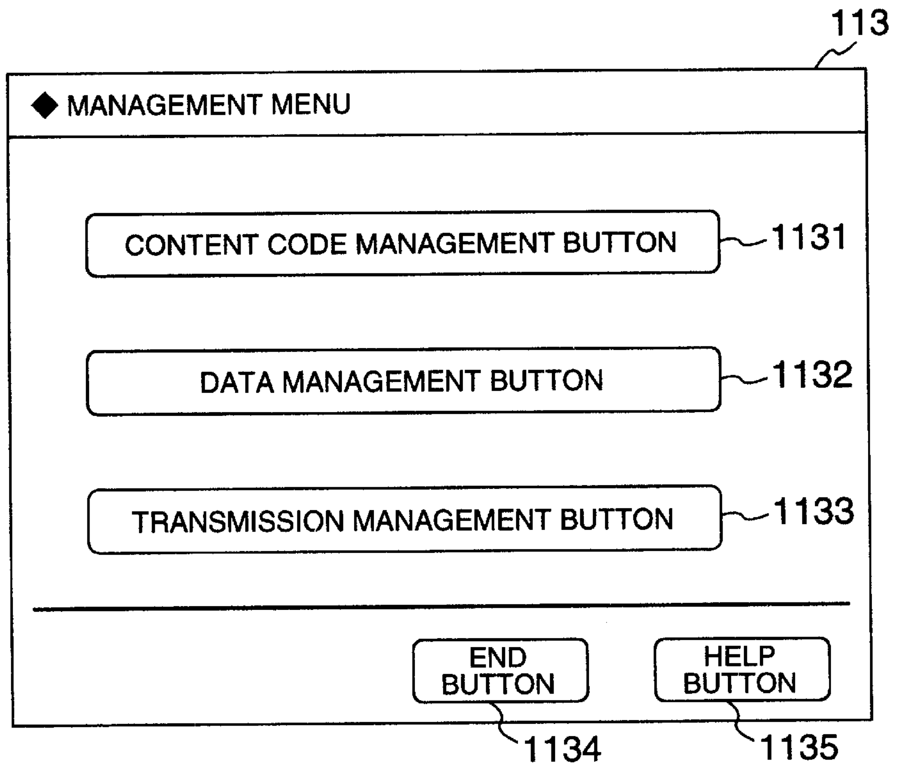
FIG. 5 is a diagram showing an example of the configuration of the management menu screen displayed on the data transmitter.

FIG. 5 shows an example of the management menu described above. A management menu 113 contains a content code management button 1131, a data management button 1132, a transmission management button 1133, an end button 1134, and a help button 1135. Clicking the data management button 1132 with the use of the input device 139 causes a content code management event. Similarly, clicking the data management button 1132 causes a data management event, clicking the transmission management button 1133 causes a package management event, and clicking the end button 1134 causes an end event. Clicking the help button 1135 displays a brief description of each button.

The following describes the operation that will be performed when an event is caused by clicking a button.

(1) Referring to FIGS. 4 and 6, the following describes the operation that will be performed when a content code management event is caused by clicking the content code management button 1131 in the management menu 113.

The input/output management function 105 of the data transmitter 10 checks the type of event (1003) and calls the content code management function 104 because the event is a content code management event (1004).

The content code management function 104 first displays the content code definition screen to prompt the user (transmission manager) to enter a content code definition. Based on this input, data is written into the content code management table 110. When the user ends the content code definition, the content code management function ends.

FIG. 6 shows an example of the structure of the content code management table 110. This table has two fields: content code 1101 and definition 1102. The content code 1101 is a code indicating the contents of data such as "the data is for men in their thirties", "the data is for people living in Tokyo", or "the data is for sports fans".

(2) Referring to FIGS. 4 and 7, the following describes the operation that will be performed when a data management event is caused by clicking the data management button 1132 in the management menu 113.

The input/output management function 105 of the data transmitter 10 checks the type of event (1003) and calls the data management function 103 because the event is a data management event (1005).

The data management function 103 first displays the data definition screen to prompt the user (transmission manager) to enter a data definition. Based on this input, data is written into the data file 109. When the user ends the data definition, the data management function ends.

FIG. 7 shows an example of the structure of the data file 109. The data file 109 has five fields: a data number 1091, a data name 1092, a data file name 1093, a content code 1094, and a provider display code 1095. The user (transmission manager) defines these five items. The data number 1091, used to identify data, is usually a number consisting of the code of data owner (owner company) and the number of data. The data name 1092 is the generic name of data. The data file name 1093 indicates the data itself. Sometimes, the data itself is a hybrid type file, for example, a hyper text file, composed of a plurality of files. Simple data is such data as text file data. The data file name 1093 usually contains storage location information such as a directory name. The content code 1094 is the content code of the data.

The provider display code 1095 represents the provider's intention regarding the display priority. The provider display code 1095 indicates a criterion on which whether to display data is determined when data is received by the receiver. One of "display", "non-display", and "forced display" is selected. Whether or not data is actually displayed is decided by the relation with an audience display code previously set by the audience in the receiver. This relation will be described later.

Figure 8:
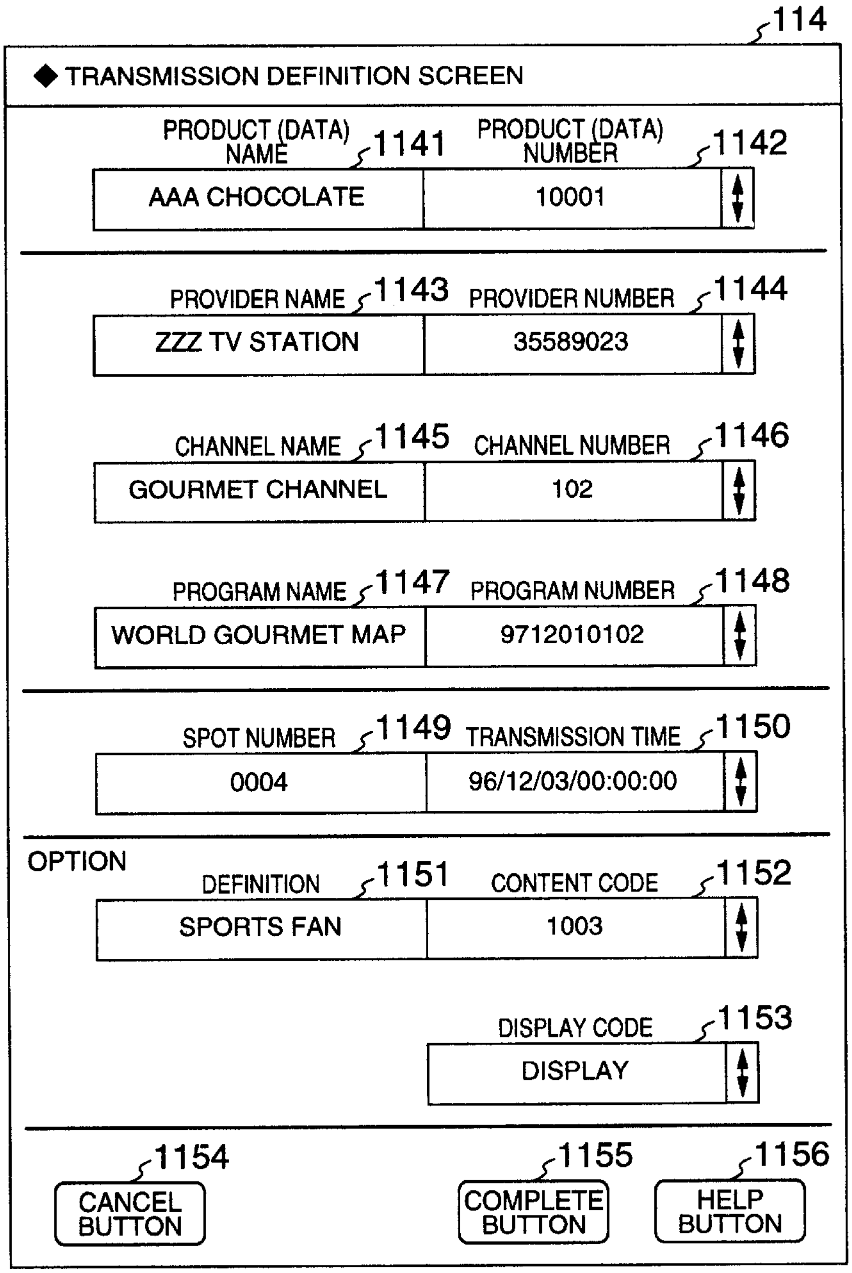
FIG. 8 is a diagram showing an example of the configuration of the content code definition screen used by the content code definition function of the data transmitter.

(3) Referring to FIGS. 4 and 8, and 9, the following describes the operation that will be performed when a package management event is caused by clicking the transmission management button 1133 in the management menu 113.

The input/output management function 105 of the data transmitter 10 checks the type of event (1003) and calls the package management function 102 because the event is a package management event (1006).

The package management function 102 first displays the transmission definition screen to prompt the user (transmission manager) to enter a transmission definition. FIG. 8 shows the transmission definition screen 114. First, a data number 1142 of data (or product data) to be transmitted is selected. When the data number is selected, a corresponding data name 1141 is displayed. Next, a provider number 1144 of the provider providing the data is entered. The provider refers to a broadcasting company or a common carrier. When the provider number 1144 is entered, a provider name 1143 is displayed. Next, a channel number 1146 provided by the specified provider is entered. The channel number 1146 must be specified for each provider number. Data is sent to the specified channel. When the channel number is selected, a corresponding channel name 1145 is displayed. Next, a program number 1148 of a program of the channel is entered. The channel is divided into programs by broadcasting time. Data is sent to the specified program. When selected, a corresponding program name 1147 is displayed.

When the user has filled out the above fields, a spot number is calculated. The spot number is the serial number of transmission. It is managed by the package management table 108. FIG. 9 shows an example of the package management table 108. The package management table 108 is composed of a provider number 1081, a channel number 1082, a program number 1083, and a current spot number 1084. The current spot number is an identification number assigned to transmitted data. The spot number is assigned to the combination of the provider number 1081, channel number 1082, and program number 1083. When a new transmission specification is entered on the transmission definition screen 114, the current spot number corresponding to the provider number 1081, channel number 1082, and program number 1083 is incremented by 1 and is displayed in the spot number 1149, shown in FIG. 8, as a new spot number.

The combination of the provider number 1144, channel number 1146, program number 1148, and spot number 1149 is called a package number.

Note that the channel number 1146 and the program number 1148 may be left unspecified. When they are not specified, the value of 0 is specified. When only the program number 1148 is left unspecified, it means that the transmission data does not depend on the program. This is useful when transmitting data to the different programs in the same channel several times repeatedly. When both the channel number 1146 and the program number 1148 are left unspecified, it means that the transmission data does not depend on the channel. This is useful when transmitting data across different channels several times repeatedly.

Next, a transmission time 1150 is specified. The data is transmitted at the specified time. It is possible to specify the transmission time of "0" to transmit data immediately. When the program number is specified, the range of the specified transmission time that may be specified is limited.

When the data number 1142 is specified, a content code 1152 and a display code 1153 corresponding to the data specified for the data management function are displayed on the transmission definition screen 114. To change these settings only for the current transmission, the content code 1152 and/or display code 1153 may be specified. If they are not specified, the values in the data file 109 are set as the "default".

When all above values are entered, the user clicks a complete button 1155. When the complete button 1155 is pressed, the package management function 102 writes information necessary for packet transmission into the packet management table 107 via the packet transmission function 101.

FIG. 10 shows the structure of the packet management table 107. The packet management table 107 is composed of a package number 1071, a data number 1072, a transmission start time 1073, a content code 1074, and a provider display code 1075. The package number 1071 is composed of the provider number 1144, channel number 1146, program number 1148, and spot number 1149. When there is a one-to-one correspondence between the provider number and the channel number, one of them need be specified. The values specified on the transmission definition screen 114 are assigned to these items.

The packet transmission function 101, which manages the packet management table 107, sends data at the specified transmission time. Each time a record, or a row, is added to the packet management table 107, the record is sent from the transmission station to the total calculator.

Figures 11, 12:
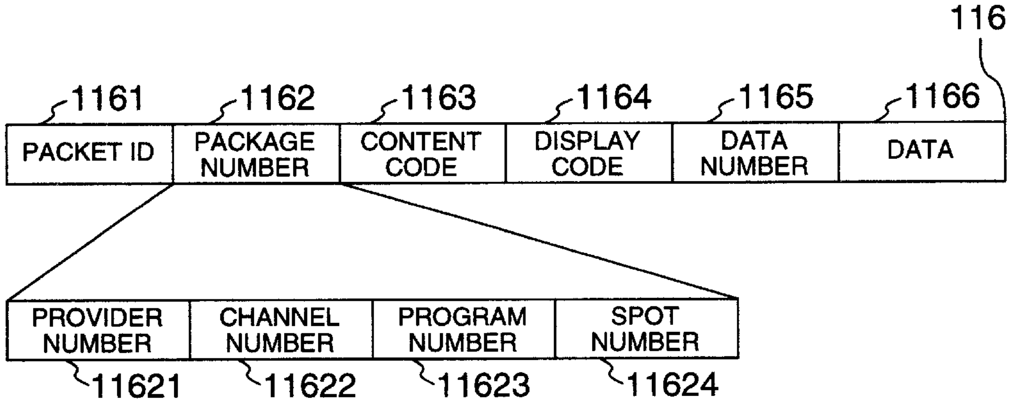
FIG. 11 is a diagram showing an example of the format of a data packet.
FIG. 12 is a diagram showing an example of the configuration of the table indicating the correspondence between the channel number and the packet ID.

FIG. 11 shows an example of the format of a transmission packet. A transmission packet 116 is composed of a packet ID 1161, a package number 1162, a content code 1163, a display code 1164, a data number 1165, and data 1166. These are created based on the packet management table 107. The package number 1162 is composed of a provider number 11621, a channel number 11622, a program number 11623, and a spot number 11624. For each channel, the same value is assigned to the packet ID 1161 which is the predetermined ID of a transmission packet. That is, as shown in FIG. 12, the transmission equipment has a packet ID table 117, the table containing the correspondence between a channel number 1171 and a packet ID 1172.

Next, the data receiver will be described.

Figure 13:
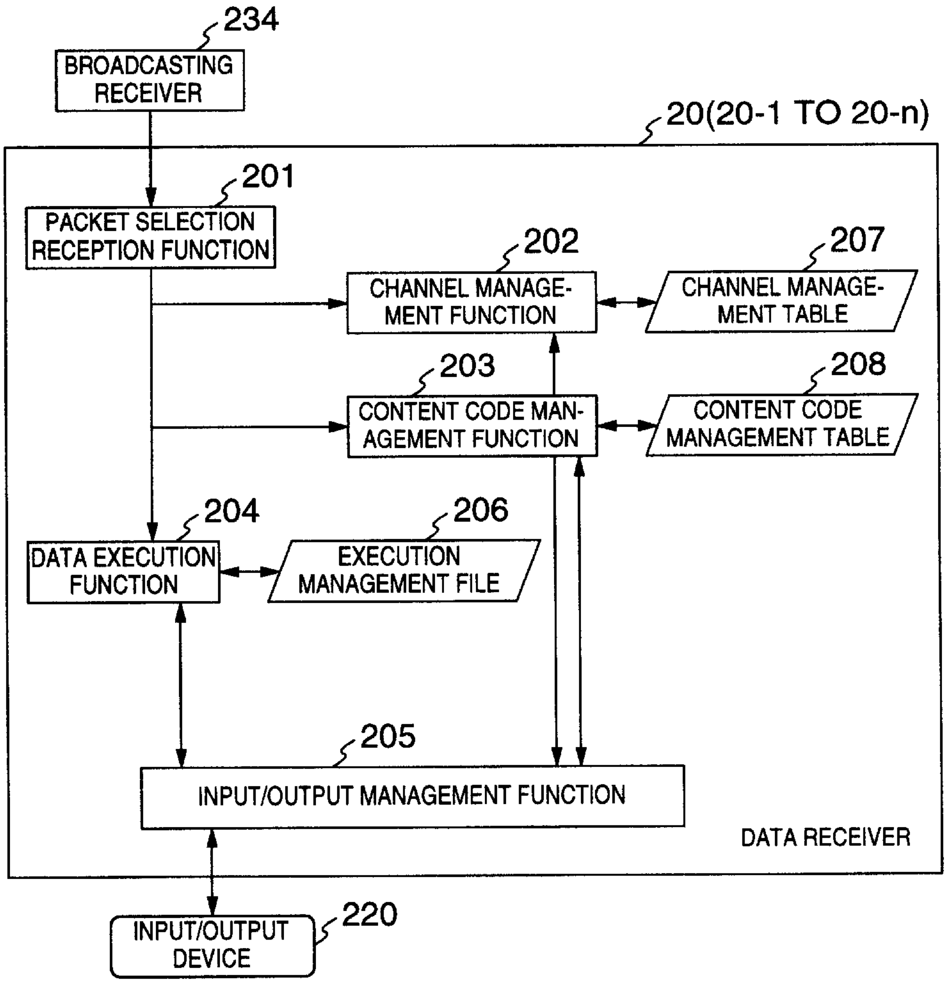
FIG. 13 is a diagram showing an example of the functional configuration of the data receiver.

FIG. 13 shows the detailed functional configuration of the data receiver 20. The data receiver 20 has five basic functions, that is, a packet selection reception function 201, a channel management function 202, a content code management function 203, a data execution function 204, and an input/output management function 205, and three tables, that is, an execution management file 206, a channel management table 207, and a content code management table 208. The packet selection reception function 201 receives packets from the communication satellite 1, which is a transmission medium, via a broadcasting receiver 234. The input/output management function 205 manages input/output to or from an input/output device 220 such as a display, keyboard, disk, and communication device.

Figure 14:
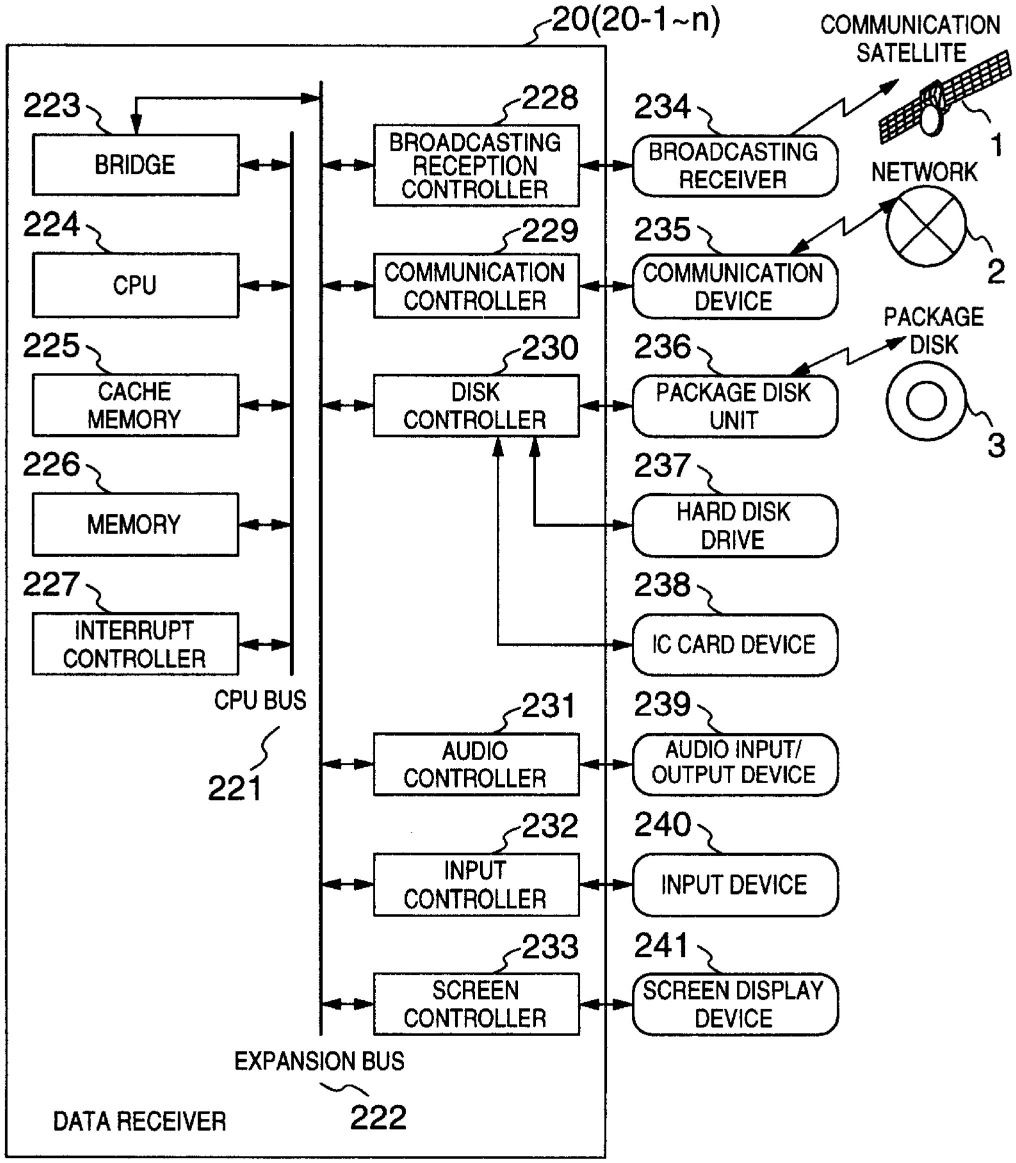
FIG. 14 is a diagram showing an example of the hardware configuration of the data receiver.

FIG. 14 shows the detailed hardware configuration of the data receiver 20. The data receiver 20 comprises a CPU bus 221, an expansion bus 222, a bridge 223, a CPU (central processing unit) 224, a cache memory 225, a memory 226, an interrupt controller 227, a broadcasting reception controller 228, a communication controller 229, a disk controller 230, an audio controller 231, an input controller 232, and a screen controller 233. The cache memory 225 and the memory 226 each contain a controller, and the memory 226 contains a ROM and a RAM.

The CPU bus 221 is a bus connecting to the CPU (central processing unit) 224. The bridge 223, CPU 224 cache memory 225, memory 226, and interrupt controller 227 are connected to the CPU bus 221.

The CPU 224 interprets instructions and controls execution, and the memory 226 stores programs and data. The cache memory 225 is a unit executing high-speed access. The interrupt controller 227 controls an interrupt signal to the CPU, that is, a signal which suspends the current CPU processing temporarily and makes its own interrupt processing request. The bridge 223 is a circuit connecting the CPU bus 221 to the expansion bus 222.

The expansion bus 222 is a bus via which data is transferred to or from various input/output devices. To the expansion bus 222 is connected the broadcasting reception controller 228, communication controller 229, disk controller 230, audio controller 231, input controller 232, and screen controller 233. The broadcasting reception controller 228, which controls broadcasting transmission via the communication satellite 1, is connected to a broadcasting receiver 234 which receives broadcasting waves from the communication satellite 1. The communication controller 229 controls communication with other devices (other data receivers 20 or data transmitters 10) via a communication device 235, such as a modem or an ISDN terminal adapter, over the network 2 such as a public network or an ISDN network. The disk controller 230 is a controller such as an SCSI disk controller. It is connected to a package disk unit 236, such as a CD-ROM drive or a DVD (Digital Video Disk) drive on which a package disk 3, a removable recording medium, is mounted, to a hard disk drive 237, and to an IC card device 238. The audio controller 231, which controls audio input and output, is connected to an audio input/output device 239 such as an microphone and speaker. The input controller 232 controls an input device 240 such as a keyboard or a mouse. The screen controller 233 controls a screen display device 241 such as a CRT, LCD, or PDP.

The relation between the functional configuration shown in FIG. 13 and the hardware configuration shown in FIG. 14 will be described. All functions shown in FIG. 13 are achieved by the CPU 224 which interprets and executes programs implementing each function. When a function is executed, the corresponding program is in the memory 226 or cache memory 225. At execution time, all tables and files shown in FIG. 13 are also in the memory 226 or cache memory 225. At non-execution time, the programs for implementing the functions, tables, and files are in the memory 226, the hard disk drive 237, or IC card device 238.

The packet reception function 201, interpreted by the CPU 224, issues instructions controlling the broadcasting receiver 234 to the broadcasting reception controller 228. The input/output management function 205, interpreted by the CPU 224, controls input/output devices 220 such as the communication device 235, package disk unit 236, hard disk drive 237, IC card device 238, audio input/output device 239, input device 240, and screen display device 241 via the communication controller 229, disk controller 230, audio controller 231, input controller 232, and screen controller 233.

The functional operation of the data receiver 20 will be described with reference to the drawings.

Figure 15:
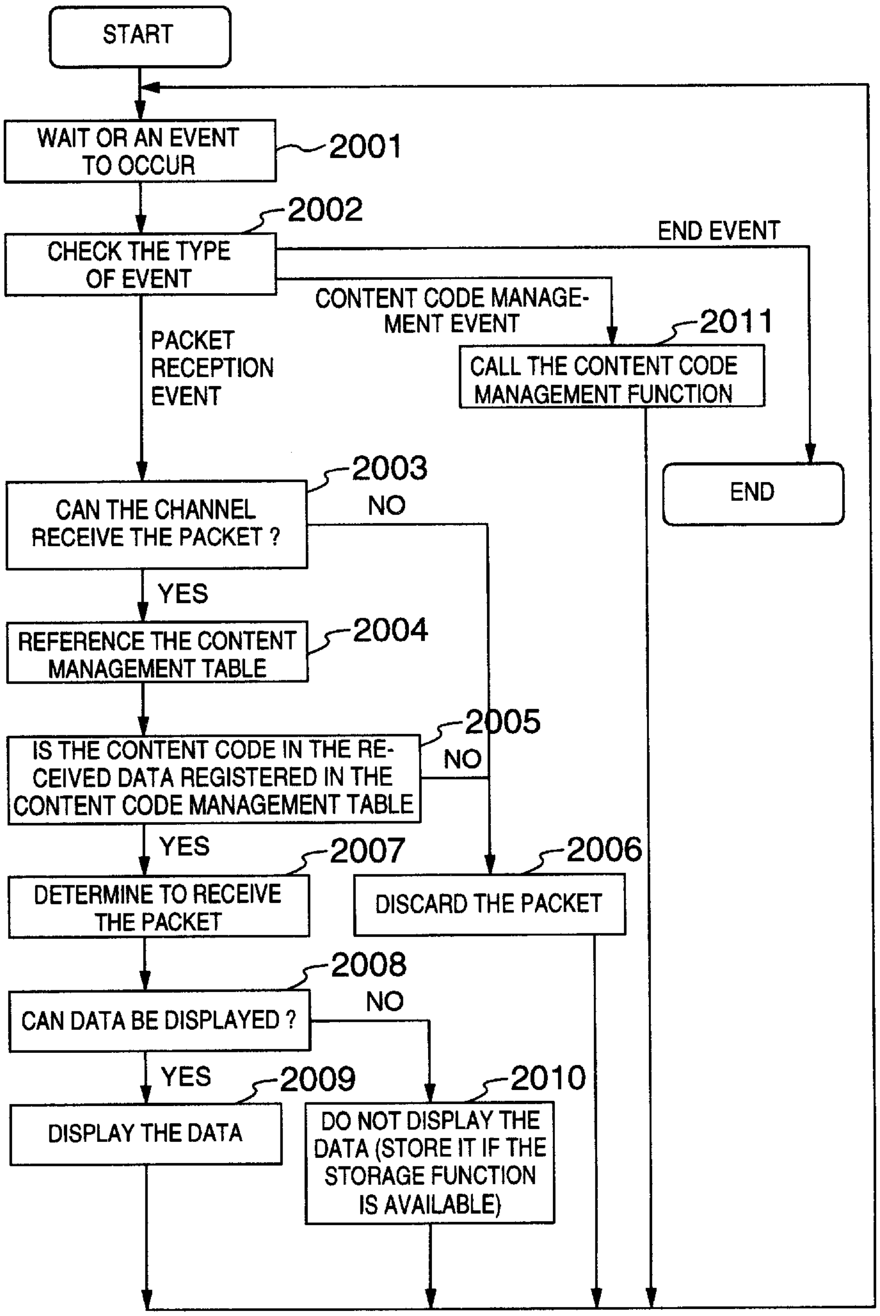
FIG. 15 is a flowchart showing an example of main processing of the data receiver.

FIG. 15 is a flowchart showing the main flow executed by the CPU 224 of the data receiver 20.

The data receiver 20 enters an event-wait status (2001).

Assume that an audience information addition request is sent to the input/output management function 205 via the input/output device 220. The input/output management function 205 causes a content code management event. When an event occurs, a check is made for the type of event (2002) and, if the event is a content code management event, a call is made to the content code management function 203 (2011).

Figure 16:
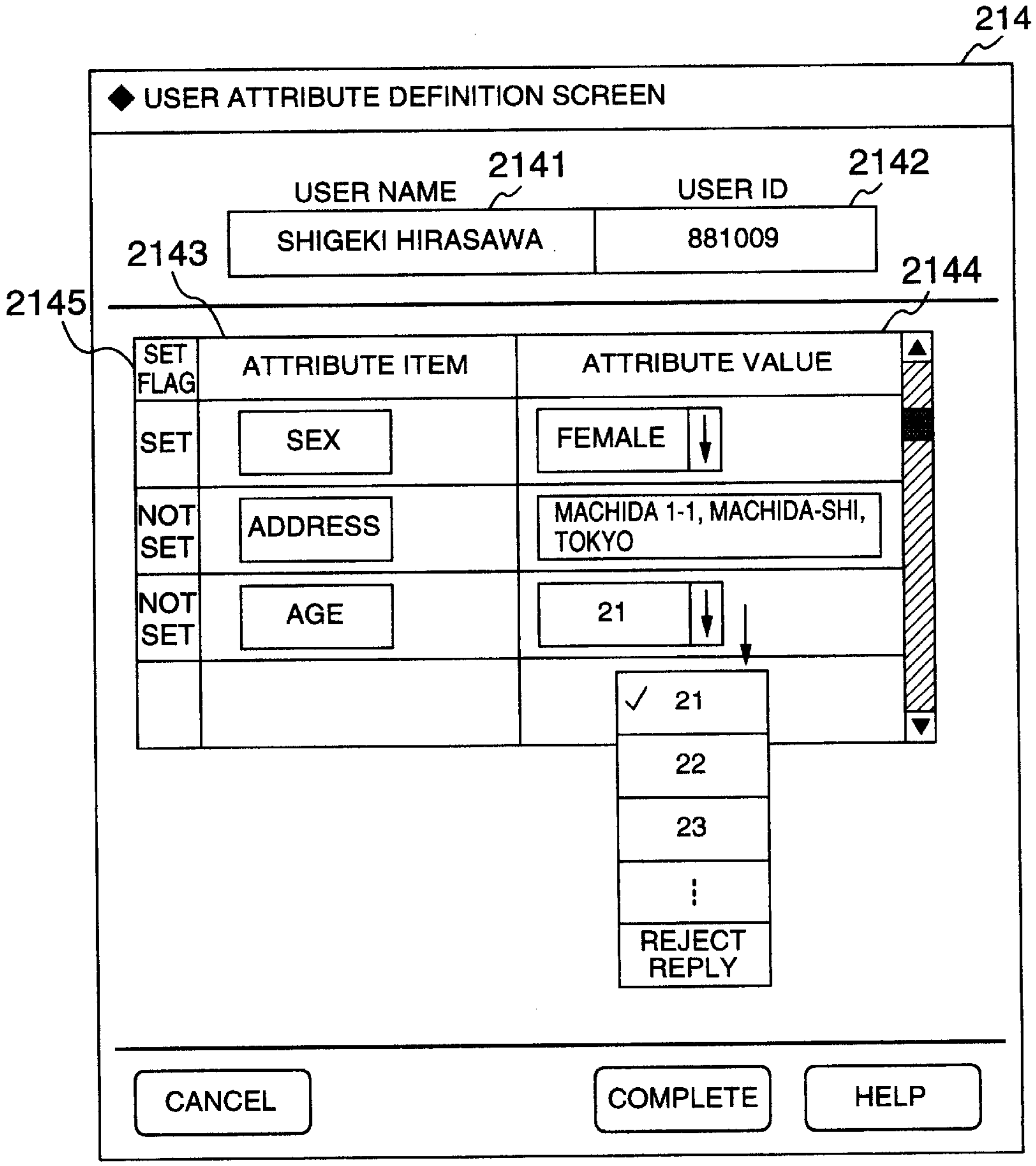
FIG. 16 is a diagram showing an example of the configuration of the user attribute definition screen displayed on the data receiver.

The content code management function 203 displays a user attribute definition screen 214 such as the one shown in FIG. 16. The screen is composed of a user name 2141, a user ID 2142, an attribute item 2143, an attribute value 2144, and a set flag 2145. The set flag 2145 indicates whether or not the user has set an attribute item. On this screen, the user (audience) types, for example, "Machida 1—1, Machida-shi, Tokyo" into the attribute item "Address" in up to 80 alphanumeric characters which are allowed for the attribute value, or select 0 or a positive integer, which is allowed for the attribute value, into the attribute item "Age". At this time, the user may reject to specify a final setting. To do so, the user may select and specify the "Reject reply" item. The user may also click the cancel button and does not enter values, for example, because the user is busy.

A content code management table 208 is set up based on these inputs from the user (audience). FIG. 17 shows the structure of the content code management table 208. Initially, the content code management table 208 of the data receiver 20 contains a content code 2081 and its definition 2082. These values are preset values set up when the receiver was shipped. They may be updated when data is received. At input time, the attribute value specified by the user (audience) is compared with the definition 2082 and whether the value is specified or not is set in a status 2083. The initial value of the status 2083 is set to "not specified".

Now, assume that the data receiver 20 has received a packet from the broadcasting receiver 234 and that an event has occurred. When an event occurs, the data receiver 20 checks the type of the event (2002). When a packet is received, the reception of the packet is considered as a packet reception event and the packet selection reception function 201 is called (2003). The packet selection reception function 201 selectively receives packets.

First, at packet reception time, the data receiver inquires of the channel management function 202 about the packet ID of the received packet to determine whether the packet can be received. The channel management function 202 manages the channel management table 207. FIG. 18 shows an example of the channel management table. The channel management table 207 is composed of a channel number 2071, a packet ID 2072, a contract status 2073, and a reception status 2074. The channel number 2071 and the packet ID 2072 are the same as those of the transmitter described above. The contract status 2073 represents whether the audience of the receiver has made the reception contract of the channel. The reception status indicates whether or not the audience of the receiver currently desires the reception through that channel. Even if the channel reception contract is made, the audience may not currently desire the reception through that channel for some reason other. For example, for a receiver capable of receiving only two channels at a time, the audience can receive through only two channels even if he or she has four contracted channels.

If the inquiry result indicates a non-reception status, the packet is discarded (2006). If the result is a reception status, control goes to the next step.

Next, the data receiver references the above-described content code management table 208 (2004), and checks if the content code added to the received packet is registered in the content code management table 208 (2005). If it is not registered, the packet is discarded (2006); if it is registered, the packet is received (2007).

Next, the data receiver 20 checks if data may be displayed (2008). The audience specifies, in advance, an audience display code indicating the audience's intention about the display priority. One of "all display", "no specification", and "all non-display" may be specified. The default is "no specification". FIG. 20 shows the relation between this audience display code and the provider display code in a packet. When the audience specifies "all display", all data that may be received is displayed regardless of the provider's specification. When the audience specifies "no specification", data is not displayed only when the provider specifies "non-display". In this case, "no-display" means that "data is not displayed automatically"; it is possible for the audience to specify and display data stored in the storage unit. When the audience specifies "all non-display", all data that may be received is not displayed regardless of the provider's specification. The audience may change this display specification any time and may change it by channel or by program.

If the data may be displayed (2008), it is displayed automatically (2009). If not, the data is not displayed (2010). The data not displayed may be stored in storage units such as a memory or a disk. The data is discarded if it is not stored. In this context, "display" means that, if the data is an executable program, the data is executed.

In this embodiment, although neither a data display time is specified nor does the transmission format (FIG. 11) contain a data display time, a data display time may be added. When a data display time is added, whether or not data may be displayed is not checked immediately after it is received; instead, the data is once stored in the storage unit and, when the display time arrives, a check is made whether the data may be displayed.

The data execution function 204 records the reception and display determination results, determined in the above reception flow, into the execution management file 206. FIG. 19 shows the structure of the execution management file 206. With the package number 2061 of the received packet as the key, the function stores the reception determination result into a selective reception 2062, and the display determination result into a display 2063. The function also stores the start and end times into a display start time 2064 and a display end time 2065, respectively. The execution management manages the display (execution) of received data. In the display start time column, the time at which the data receiver 20 automatically displays data, as well as the time at which the user displays data, is recorded.

The display 2063 of the execution management file 206 is not always required. If it is omitted, "displayed" is assumed if the value of the display end time 2065 is larger than the value of the display start time 2064; otherwise, "not displayed" is assumed.

In the manner described above, data packets are sent from the data transmitter 10 to the data receivers 20-1–**20-*n***.

Thus, the execution management files 206 recorded by all the data receivers **20-*n* are sent to, and calculated by, the total calculator 30 at a regular interval or when the audience returns a response to received data. The data execution function 204 sends the contents of the execution management file 206 via the input/output management function 205**. This is called the transmission of program rating data.

Figure 21:
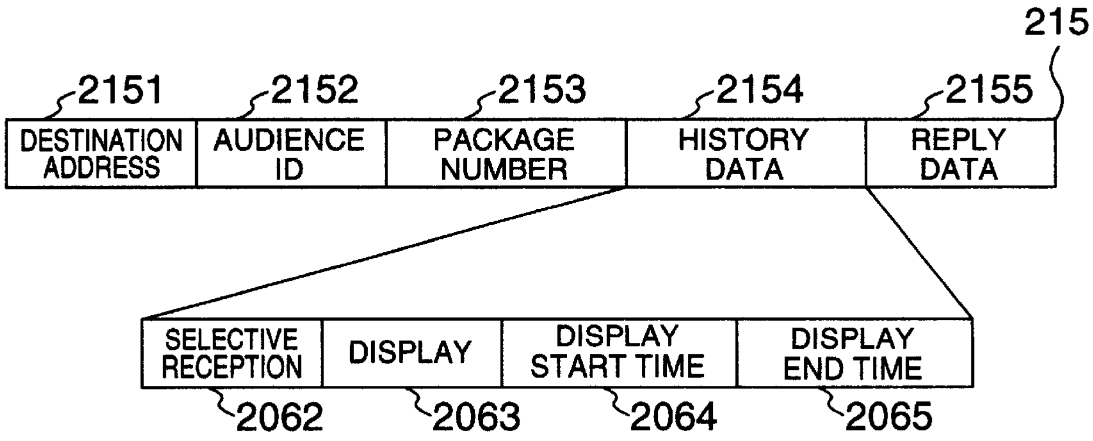
FIG. 21 is a diagram showing an example of the format of a program rating data packet.

FIG. 21 shows the format of program rating data 215. The program rating data 215 is composed of the following five items: a destination address 2151, an audience ID 2152, a package number 2153, history data 2154, and reply data 2155. The destination address 2151, preset in the data receiver 20, is an address used to communicate with the total calculator 30. The audience ID 2152, usually obtained from the IC card device 238, is an ID identifying the audience. The package number 2153 is the package number of a received packet. The history data 2154 is composed of the following four items: a selective reception 2062, display 2063, display start time 2064, and display end time 2065. The reply data 2155 is stored when the reception data requests the audience to reply and when the audience has replied.

The display 2063 of the program rating data 215 is not always required. When it is omitted, "displayed" is assumed if the value of the display end time 2065 is larger than the value of the display start time 2064; otherwise, "not displayed" is assumed.

The program rating data 215, if collected from the receivers of a specific number of people, allows us to understand the status of audience and/or trend of audience. The collection ratio of program rating data on a package number indicates the reception ratio of the data.

Combining the "selective reception" item in the program rating data with the contents of the packet management table 107 previously sent from the transmission station allows us to estimate which content code's data the audience received or rejected, that is, why the audience rejected the reception of the data.

This is because the audience attribute may be estimated from the content code that is specified for him or her. The "display" item indicates whether the audience rejected the display or not. The "display start time" item indicates whether the data is displayed immediately after reception or at a later time. The "display end time" item allows us to estimate how much the audience is interested in the data.

We claim:

1. An information receiver comprising:

a broadcasting transmitter for transmitting a plurality of data to an information receiver which selects a specified data among said plurality of data added to a broadcasting program on a basis of contents of data and determines as to whether or not said specified data selected should be displayed; and an input controller for adding display codes to said plurality of data, said display codes enabling a forced display of data in said information receiver, when said information receiver rejects to display data.

2. An information transmitting method, comprising the steps of:

adding display codes to a plurality of data, said display codes enabling a forced display of data in an information receiver transmitting said plurality of data to an audience who selects a specified data among a plurality of data added to a broadcasting program on a basis of contents of data determines as to whether or not said specified data selected should be displayed; and forcedly displaying a data, when enabled by said display code when said information receiver rejects to display a data.

3. A transmitter for transmitting a data added to a broadcasting program, comprising:

a transmission unit for transmitting said data in plurality of times through a predetermined channel in a day and/or through multiple channels to a receiver which determines as to whether or not said data should be received, receives said data on a basis of determination results as to whether or not said data should be received, determines as to whether or not said data should be displayed, displays said data on a basis of determination results as to whether or not said data should be displayed, and creates a management file including said determination results as to whether or not said data should be received and said determination results as to whether or not said data should be displayed;

a transmission control unit for controlling a transmission of said data; and a central processing unit for instructing said transmission control unit to transmit said data at a predetermined time, wherein said central processing unit adds a display code to said data, said display code being used for forcedly displaying said data in said receiver in case of said receiver rejects to display said data.

4. A transmitter for transmitting a data added to a broadcasting program, comprising:

a transmission unit for transmitting said data to a receiver which determines as to whether or not said data should be received, receives said data on a basis of determination results as to whether or not said data should be received, determines as to whether or not said data should be displayed, displays said data on a basis of determination results as to whether or not said data should be displayed, and creates a management file including said determination results as to whether or not said data should be received and said determination results as to whether or not said data should be displayed;

a transmission control unit for controlling a transmission of said data; and a central processing unit for instructing said transmission control unit to transmit said data at a predetermined time, wherein said central processing unit adds a display code to said data, said display code being used for forcedly displaying said data in said receiver in case of said receiver rejects to display said data.

5. A transmitter according to claim 4, wherein said central processing unit adds a content code for identifying contents of said data to said data.

6. A transmitter for transmitting a data which is different from a broadcasting program, comprising:

a central processing unit for adding a display code to said data, said display code being used for forcedly displaying said data in a receiver in case of said receiver rejects to display said data; and a transmission unit for transmitting data added with said display code to said receiver which determines as to whether or not said data should be received, receives said data on a basis of determination results as to whether or not said data should be received, determines as to whether or not said data should be displayed, displays said data on a basis of determination results as to whether or not said data should be displayed, and creates a management file including said determination results as to whether or not said data should be received and said determination results as to whether or not said data should be displayed.

7. A method of transmitting a data which different from a broadcasting program, comprising the steps of:

adding a display code to said data, said display code being used to forcedly displaying said data in a receiver in case said receiver rejects to display said data; and transmitting data added with said display code to said receiver which determines as to whether or not said data should be received, receives said data on a basis of determination results as to whether or not said data should be received, determines as to whether or not said data should be displayed, displays said data on a basis of determination results as to whether or not said data should be displayed, and creates a management file including said determination results as to whether or not said data should be received and said determination results as to whether or not said data should be displayed.

* * * * *